United States Patent
Schorman (10) Patent No.: US 9,568,282 B1
(45) Date of Patent: Feb. 14, 2017

(54) APPARATUS FOR SECURELY MOUNTING ACCESSORIES TO A CAMERA OR FIREARM

(71) Applicant: Wooden Camera, Inc., Dallas, TX (US)

(72) Inventor: Ryan Reed Schorman, Dallas, TX (US)

(73) Assignee: Wooden Camera, Inc., Dallas, TX (US)

( * ) Notice: Subject to any disclaimer, the term of this patent is extended or adjusted under 35 U.S.C. 154(b) by 58 days.

(21) Appl. No.: 14/024,358

(22) Filed: Sep. 11, 2013

Related U.S. Application Data (60) Provisional application No. 61/700,809, filed on Sep. 13, 2012.

(51) Int. Cl.
| | | |
|---|---|---|
| *F16M 11/04* | (2006.01) | |
| *F41G 11/00* | (2006.01) | |
| *F16M 13/02* | (2006.01) | |
| *F16M 13/06* | (2006.01) | |
| *G03B 17/56* | (2006.01) | |
| *F16M 13/04* | (2006.01) | |

(52) U.S. Cl.
CPC .......... *F41G 11/003* (2013.01); *F16M 11/041* (2013.01); *F16M 11/043* (2013.01); *F16M 11/045* (2013.01); *F16M 11/046* (2013.01); *F16M 11/048* (2013.01); *F16M 13/02* (2013.01); *F16M 13/04* (2013.01); *F16M 13/06* (2013.01); *G03B 17/561* (2013.01); *F16M 2200/028* (2013.01); *Y10S 224/908* (2013.01)

(58) Field of Classification Search
CPC .................................................. F41G 11/003
See application file for complete search history.

(56) References Cited

U.S. PATENT DOCUMENTS

| | | | | |
|---|---|---|---|---|
| 1,285,628 A | * | 11/1918 | Craley | ............................ 384/39 |
| 2,756,956 A | * | 7/1956 | Anderson | .............. F16M 11/04 |
| | | | | 248/178.1 |
| 4,033,539 A | * | 7/1977 | Bardocz | ..................... 248/228.6 |
| 4,044,486 A | * | 8/1977 | Van Holten | ..................... 42/127 |
| 5,230,490 A | * | 7/1993 | Sloop | .......................... 248/187.1 |
| 5,429,332 A | * | 7/1995 | Ishikawa | .................... 248/187.1 |
| 5,632,462 A | * | 5/1997 | Kallas | ..................... B60R 11/02 |
| | | | | 224/42.11 |

(Continued)

FOREIGN PATENT DOCUMENTS

| | | | | |
|---|---|---|---|---|
| DE | 202011002180 | * | 10/2011 | |
| FR | 2552579 A1 | * | 3/1985 | ............. F16M 11/02 |
| WO | WO 2011091018 A2 | * | 7/2011 | |

OTHER PUBLICATIONS

Amazon (Website), Desmond P-70 70mm QR Lens Plate Arca Compatible Dual Dovetail and D-Ring P70 DP-70, Mar. 8, 2013.*

(Continued)

*Primary Examiner* — Joshua J Michener
*Assistant Examiner* — Chiedu Chibogu
(74) *Attorney, Agent, or Firm* — Fish & Richardson P.C.

(57) ABSTRACT

An apparatus, system, and method for mounting accessories on device, such as a camera, binoculars, firearm, weapon, and the like. The apparatus, system, and method may include a mounting device, which may be a bracket or rail. The apparatus, system, and method also include a safety mechanism that may be an integral part of the mounting device, or may be coupled or attached to the mounting device. The safety device allows accessories to be attached to the mounting device, but also prevents inadvertent detachment of the accessories from the mounting device.

17 Claims, 7 Drawing Sheets

(56) References Cited

U.S. PATENT DOCUMENTS

| | | | | |
|---|---|---|---|---|
| 6,338,219 | B1 * | 1/2002 | Watson, Jr. | F41G 1/01 42/130 |
| D500,114 | S * | 12/2004 | Oz | D22/109 |
| 6,886,288 | B1 * | 5/2005 | Yocum | F41G 11/003 42/124 |
| D533,618 | S * | 12/2006 | Swan | D22/110 |
| 7,185,862 | B1 * | 3/2007 | Yang | 248/187.1 |
| 7,243,456 | B2 * | 7/2007 | Williams | F41G 11/003 42/124 |
| 7,549,807 | B2 * | 6/2009 | Nazarian | 396/420 |
| 7,614,805 | B2 * | 11/2009 | Showalter | 396/428 |
| 7,752,797 | B1 * | 7/2010 | Swan | F41C 23/02 42/85 |
| 7,883,279 | B2 * | 2/2011 | Kendall | 396/428 |
| 8,348,214 | B2 * | 1/2013 | Vogt | 248/316.4 |
| D683,417 | S * | 5/2013 | Daniel | D22/108 |
| 8,468,930 | B1 * | 6/2013 | Bell | F41G 11/001 342/67 |
| 8,769,859 | B2 * | 7/2014 | Li et al. | 42/124 |
| 8,806,795 | B1 * | 8/2014 | Kay | F41C 27/00 42/146 |
| 8,827,576 | B2 * | 9/2014 | Johnson | 396/428 |
| 8,887,975 | B1 * | 11/2014 | Basile | B62J 11/00 224/441 |
| 9,239,210 | B2 * | 1/2016 | Mayberry | F41C 23/16 |
| 2003/0230022 | A1 * | 12/2003 | Battaglia | F41G 11/003 42/111 |
| 2004/0113033 | A1 * | 6/2004 | Johnson | 248/183.3 |
| 2004/0223078 | A1 * | 11/2004 | Zadok | 348/375 |
| 2006/0059762 | A1 * | 3/2006 | Blair | 42/124 |
| 2011/0010979 | A1 * | 1/2011 | Houde-Walter | F41C 23/22 42/84 |
| 2011/0197491 | A1 * | 8/2011 | McCann | 42/132 |
| 2012/0210624 | A1 * | 8/2012 | Schneider et al. | 42/90 |
| 2013/0256484 | A1 * | 10/2013 | Kessler et al. | 248/224.7 |
| 2013/0312307 | A1 * | 11/2013 | Rorick | 42/90 |

OTHER PUBLICATIONS

LM76 (Website), Profile Rail Guide Linear Motion Bearings, Jan. 11, 2010.*

Amazon (Website), Desmond P-70 70mm QR Lens Plate Arca Compatible Dual Dovetail and D-Ring P70 DP-70_Supplemental, Jul. 25, 2015.*

Jasper Engineering, Heavy Duty Slide Bars, Jun. 6, 2002, website: http://web.archive.org/web/20020606172920/http://www.stereoscopy.com/jasper/heavyduty-bar.html.*

* cited by examiner

APPARATUS FOR SECURELY MOUNTING ACCESSORIES TO A CAMERA OR FIREARM

CROSS REFERENCE TO RELATED APPLICATION

This application claims priority to U.S. Provisional Application Ser. No. 61/700,809, entitled "Apparatus, System, and Method for Securely Mounting Accessories to a Camera or Firearm", filed Sep. 13, 2012, which is hereby incorporated by reference.

BACKGROUND

This disclosure relates to an apparatus, system, and method for securely mounting accessories, including camera accessories and accessories for other devices. More specifically, this disclosure relates to an apparatus, system, and method for safely securing various kinds of accessories and other devices to a camera, a weapon, binoculars, and the like.

Accessory mounting brackets (also referred to as rails or mounts) are found on a variety of products, including still and video cameras, binoculars, guns and other weapons. These mounting brackets may be used hold a wide variety of accessories, including battery packs, adapters, lights, handles, scopes, sights, bayonets, grips, and laser aiming modules.

Conventional mounting brackets allow users to slide an accessory onto the bracket, but the accessory may also inadvertently or accidentally slide off. For example, if the bracket is mounted on a camera, and the camera is accidentally tilted, the angle of tilt may allow the accessory to slide off the end of bracket. If this occurs, the accessory may be damaged. The conventional mounting brackets lack a safety mechanism that will allow accessories to be simply and quickly placed onto a mounting bracket and also prevent the accessories from inadvertently or accidentally coming off.

SUMMARY

The invention provides an apparatus, system, and method for securely mounting accessories on a camera, binoculars, firearms, weapons, and the like. The apparatus or system includes a mounting device, which may be a bracket or rail. The apparatus or system also includes a safety mechanism that may be an integral part of the mounting device, or may be coupled or attached to the mounting device. The safety device allows accessories to be attached to the mounting device, but also prevents inadvertent detachment of the accessories from the mounting device.

An embodiment of the invention includes a mounting bracket with at least one rail and at least one moveable safety mechanism. The safety mechanism may be spring-loaded or be moveable via some other form of actuation. In a particular embodiment, the safety mechanism may include a pin, rod, or peg that can be recessed into a mounting bracket and that, via some form of actuation (for example, a spring) can be made to extend from the mounting bracket; the pin is pressed down into the mounting bracket to place an accessory onto the bracket and is then released, thereby extending from the bracket and preventing the accessory from sliding off unless the pin is pressed down and recessed back into the bracket. An embodiment of the invention is a method for installing and removing an accessory from a device using a mounting bracket, in which a moveable safety mechanism prevents the accessory from inadvertently coming off the mounting bracket.

One of skill in the art will appreciate that the invention is not limited to the embodiments described above and is intended to cover the embodiments described in this specification as well as other embodiments that are within the spirit and scope of the this specification and the claims set forth below.

DESCRIPTION OF DRAWINGS

Like reference symbols in the various drawings indicate like elements.

DETAILED DESCRIPTION

Figures 1, 2:
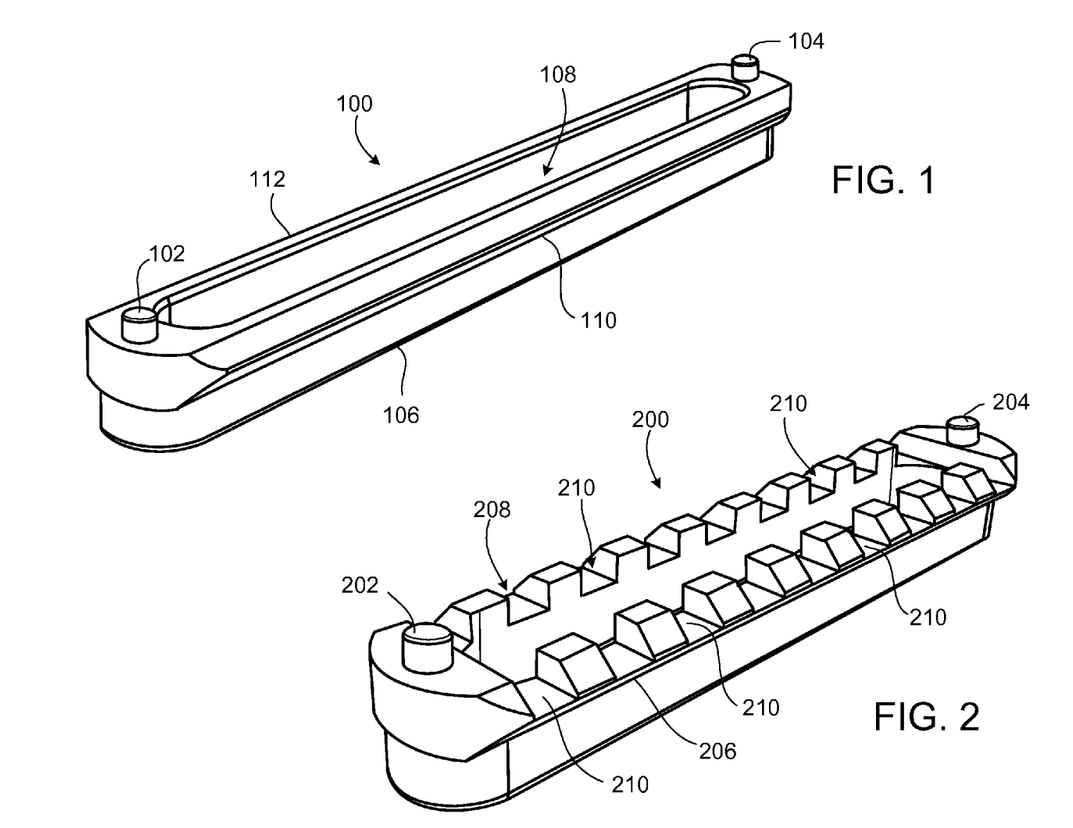
FIG. 1 is a perspective view of a mounting device with a safety mechanism on each end.
FIG. 2 is a perspective view of a notched mounting device with a safety mechanism on each end.

The present invention includes an apparatus, system, and method for safely mounting camera, weapons, binocular, etc., equipment and accessories to a mounting device to prevent the accessories from coming off. FIG. 1 is a perspective view of an exemplary embodiment of the invention including a mounting device 100 with a safety mechanism 102, 104 at each end. As shown, this embodiment includes spring actuated-safety mechanisms 102, 104. The mounting device 100 may be attached to another device, such as a camera or firearm, at the bottom 106 of the mounting device 100. The top 108 of the mounting device 100 has rails 110, 112 on each side that extend outward from the mounting device 100 and run along at least a portion of the length of the mounting device 100. As can be seen in FIG. 1, the top 108 of the mounting device 100 may have a trough formed along its length, which can be seen in greater detail in the top view of FIG. 3; this trough is shown also shown in FIGS. 2, 5, and 6A-6C. As will be appreciated, the trough may be included to lighten the weight of the mounting apparatus.

As will be described in more detail below, an accessory (now shown in FIG. 1) may be placed onto the mounting device 100 by depressing the safety pins 102, 104 and sliding the accessory from either end onto the rails 110, 112. The depressed safety pin 102 or 104 will spring back to its extended state shown in FIG. 1 after the accessory is slid along the rails 110, 112 far enough that the safety pin 102 or 104 is uncovered. The mounting device 100 may be various lengths, as desired for the application. The pins may be configured to extend various distances outward from the mounting rail 100, as desired. In addition, instead of having two safety pins, one on each end, the invention encompasses having a single actuated safety pin on one end and a fixed mechanism or structure on the other. In such an embodiment, the accessory would be installed on and removed from the end having the actuated safety pin.

FIG. 2 shows another embodiment of a mounting rail 200. Like the mounting rail 100, the mounting rail 200 has spring-actuated safety pins 202, 204 and rails 206, 208. The mounting rail 200 also includes a series of notches 210, sometimes referred to as Picatinny locking slots. Picatinny is a standard defining the slot size and spacing of slot centers. The notches 210 need not be made to the Picatinny standard, and the slot size and spacing may be modified as desired.

Figure 3:
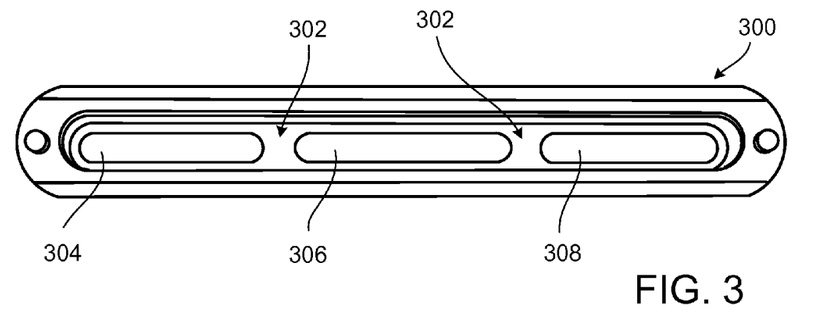
FIG. 3 is a top view of a mounting device with a safety mechanism on each end and a slotted area for various screw spacings and sizes.

FIG. 3 is a top view of the mounting device 100 showing a slotted area 302 at the bottom of the trough described above with respect to FIG. 1; the slotted area 302 is configured to allow various screw spacings and sizes. The slotted area 302 in this embodiment includes three slots 304, 306, 308 that accept screws (not shown). The mounting bracket 100 is placed onto the device with which it is being used, e.g., camera or firearm, and any number of screws (here, the number may be 2 or 3) are screwed into holes on the device via the slots 304, 306, and/or 308.

Figure 4:
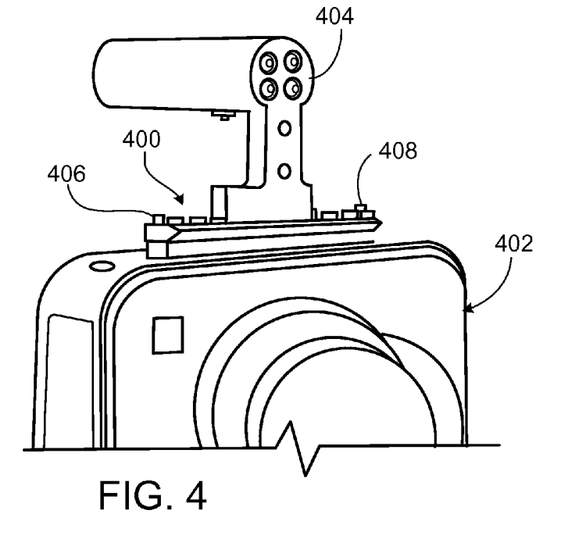
FIG. 4 shows a mounting device like that shown in FIG. 2 attached to a camera.

FIG. 4 shows a Picatinny mounting device 400 (like that shown in FIG. 2) attached to a camera 402. A handle accessory 404 is mounted on the mounting device 400. Safety pins 406, 408 are shown on either end of the mounting device 400.

Figure 5:
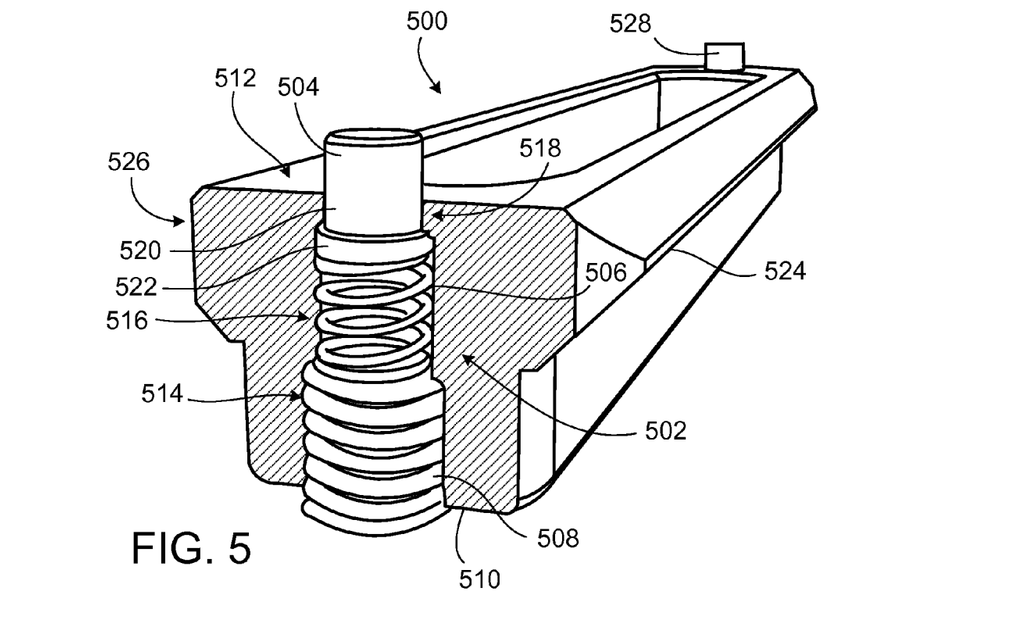
FIG. 5 is a cut-away view of a mounting device showing an exemplary embodiment of a spring-actuated safety pin.

FIG. 5 is a cut-away view of a mounting device 500 showing an exemplary embodiment of a safety mechanism, in particular a spring-actuated safety pin assembly 502. The assembly 502 includes a pin 504, spring 506, and set screw 508. The pin 504 is inserted into a hole in the bottom 510 of the mounting device 500. The hole extends through the mounting device 500 from the bottom 510 to the top 512. In the exemplary embodiment, the hole has varying diameters; the lowest portion 514 of the hole is the largest diameter, the middle 516 smaller, and the top 518 the smallest. The pin 504 has two diameters; the top 520 is smaller than the bottom 522. Having a larger diameter, the bottom 522 of the pin 504 is larger than the diameter of the top 518 of the hole, preventing the pin 504 from popping out of the hole. However, the top 520 of the pin 504 may extend outward from the hole, as shown. The spring 506 is inserted into the hole on top of the pin 504 in the middle portion 516 of the hole. The set screw 508 is then screwed into the hole on top of the spring 506. The set screw 508 provides a platform for the spring 506 to actuate. As shown, the exemplary mounting device 500 also has two rails 524, 526 and a second pin 528.

One skilled in the art will appreciate that this configuration of the safety mechanism is merely exemplary and that other configurations are available and are within the scope of the invention; in fact, a lever-based embodiment is described in detail below in connection with FIGS. 7 and 8. As an example of alternative embodiments of the safety mechanism shown in FIG. 5, the set screw 508 need not be threaded, but instead could be a weld or a dowel pin that does not move within the hole. Alternatively, instead of using a set screw or dowel pin or weld in the bottom of the hole, a plate could be placed over the bottom of the hole. It will also be appreciated that the hole need not be circular. An actuator other than a spring could be used. In addition, the material used for the mounting device may be a metal or some type of plastic or composite material. One of the safety pins may be fixed instead of spring actuated. For example, the pin 528 in FIG. 5 may be fixed in place.

Figure 6A:
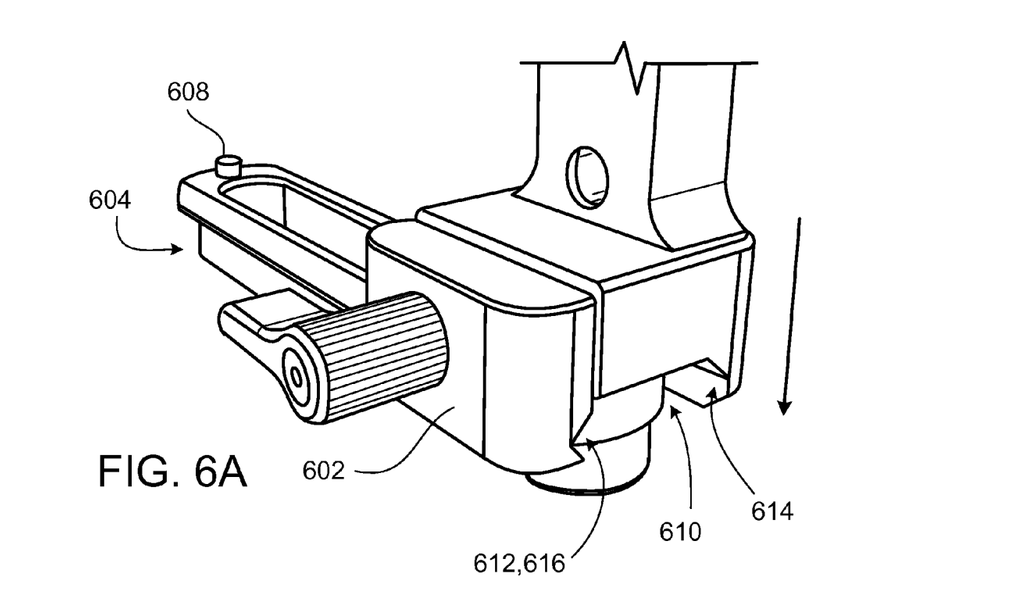
FIGS. 6A, 6B, and 6C show an accessory being installed on a mounting device over a spring-actuated safety pin.
Figure 6B:
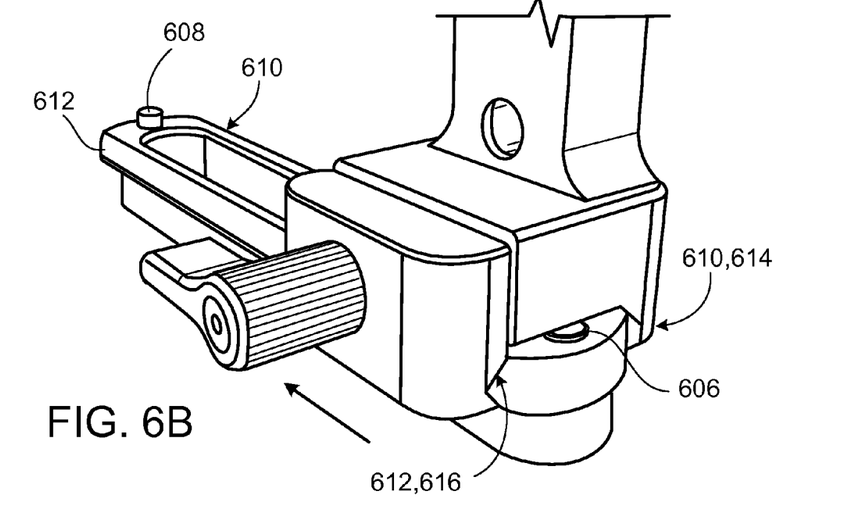
Figure 6C:
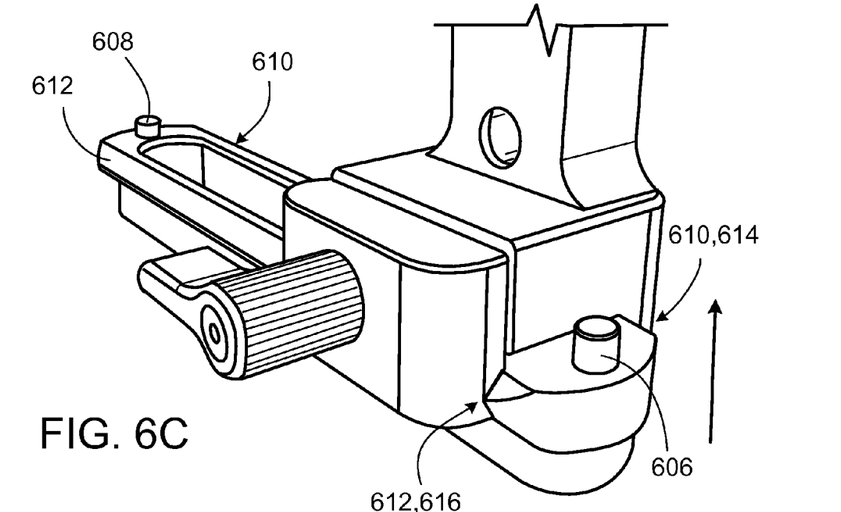

FIGS. 6A, 6B, and 6C show an accessory 602 being installed on a mounting device 604 over a spring-actuated safety pin 606. The mounting device has pins 606, 608 and two rails 610, 612. As shown in FIG. 6A, the accessory 602 has two slots 614, 616 that are complementary to the two rails 610, 612. The safety pin 606 is pushed down to install the accessory 602. The slots 614, 616 are aligned with the rails 610, 612 to allow accessory 602 to be installed on the mounting device 604. As shown in FIG. 6B, the accessory 602 slides along the rails 610, 612 across the pin 606 toward the middle of the mounting device 604. FIG. 6B shows the accessory 602 clearing the pin 606, allowing the pin 606 to spring back into place extending upward from the mounting device 604. With both pins 606, 608 extending from the mounting device 604, the accessory 602 cannot be removed prior to depressing one of the pins 606, 608.

Figure 7:
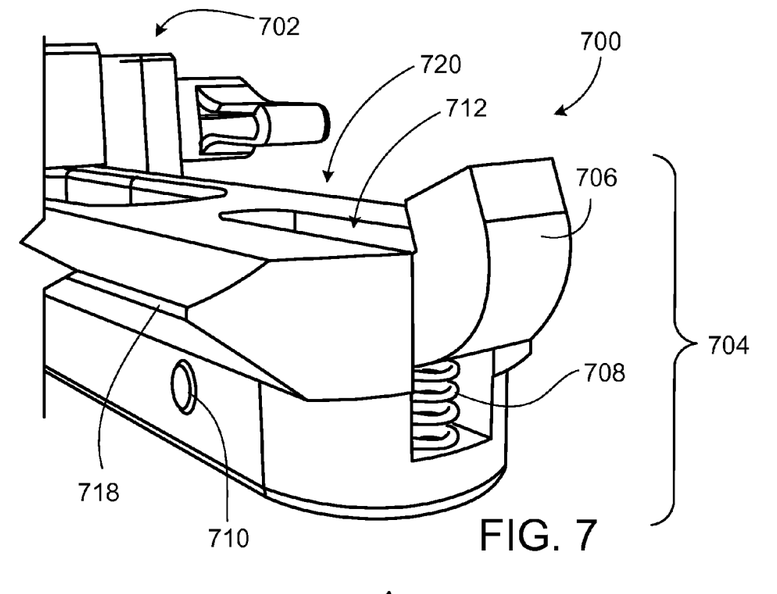
FIG. 7 shows an alternative embodiment of a mounting device on which an accessory has been installed, the mounting device having a spring-actuated lever assembly.

FIG. 7 shows an alternative embodiment of a mounting device 700 on which an accessory 702 can be mounted, the mounting device 700 having a spring-actuated lever assembly 704. The lever assembly 704 includes a safety lever 706, a spring 708, and a set screw 710. The set screw 710 may alternatively be a dowel pin. The set screw 710 is screwed through a transverse hole in the mounting device 700, through the safety lever 706, giving the lever 706 a pivot point along the axis of the set screw 710. The lever 706 lies in a trough 712 formed in the mounting device 700. The spring 708 is also within the trough 712 and is used to actuate the lever 706 upward. The lever 706 may be depressed by pushing down on it, thereby compressing the spring 708.

Figure 8:
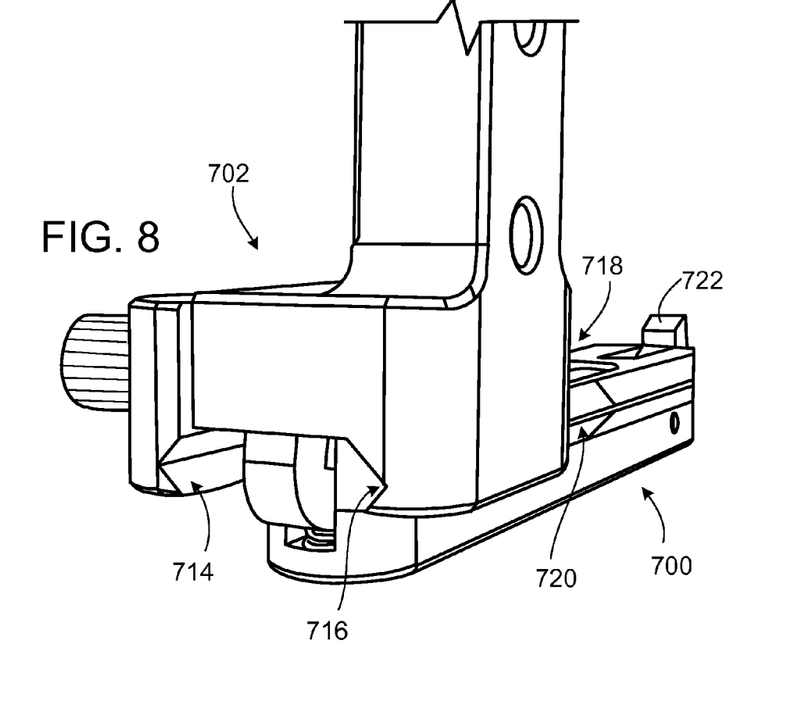
FIG. 8 is another view of the mounting device of FIG. 7 showing an accessory being installed over the spring-actuated lever assembly.

FIG. 8 is another view of the mounting device 700 of FIG. 7 showing the accessory 702 being installed over the spring-actuated lever assembly 704. Similar to what is shown in FIGS. 6A, 6B, and 6C, the lever 706 is depressed, thereby compressing the spring 708, and slots 714, 716 on the accessory 702 are mated to the rails 718, 720 on the mounting device 700. The accessory 702 is slid along the rails 718, 720 and over the depressed safety lever 706 until the accessory 702 clears the end of the safety lever 706 allowing it to spring upward and locking the accessory 702 onto the mounting device 700. In FIG. 8, a second lever 722 can also be seen. The two levers 706, 722 prevent the accessory 700 from accidentally sliding off the rails 718, 720. As stated above, one of the safety mechanisms on one end of the mounting device 700 could be fixed instead of being actuate-able.

Figure 9A:
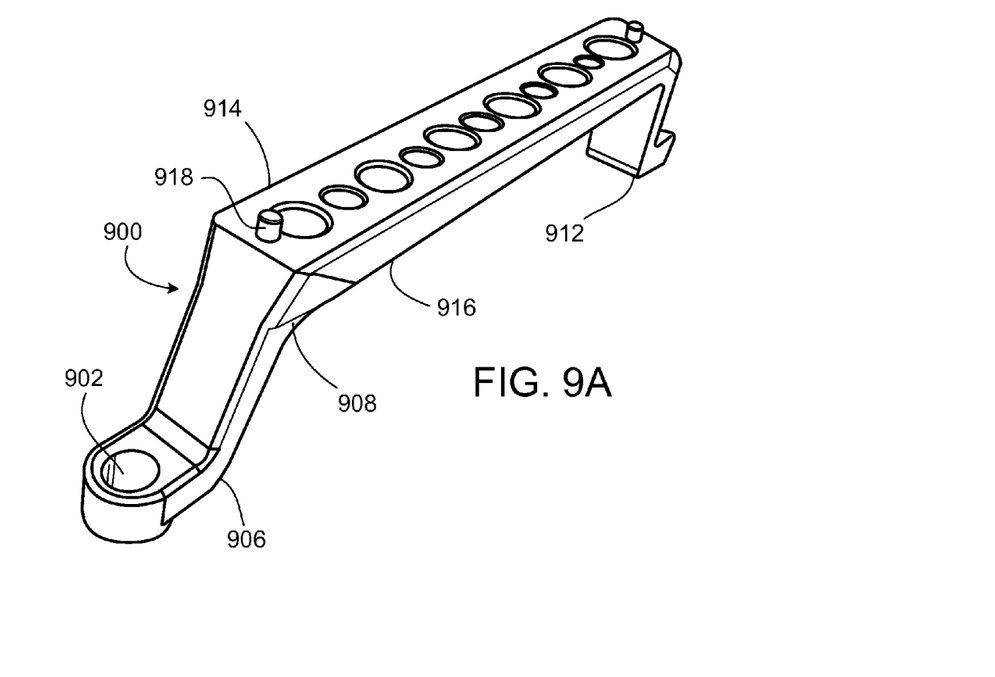
FIGS. 9A and 9B show another embodiment of a mounting device.
Figure 9B:
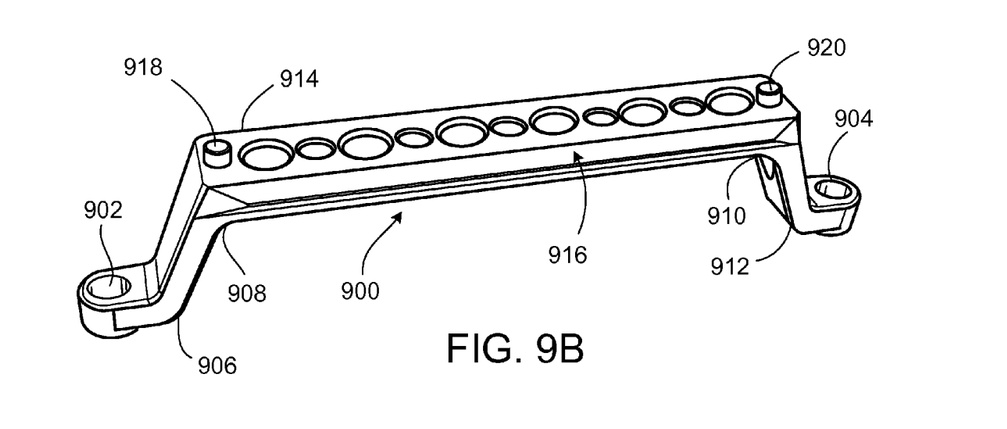

FIGS. 9A and 9B show another embodiment of a mounting device 900. The exemplary mounting device 900 has two screw holes 902, 904 at either end that allow the mounting device 900 to be installed on a camera, firearm, or other device. The mounting device 900 is bent at four points 906, 908, 910, 912 along its length, allowing the mounting device 900 to fit over protrusions or to act as a handle. The mounting device 900 has two rails 914, 916 and two safety pins 918, 290. The safety pins 918, 920 may be configured and operate like that described in connection with FIG. 5. In addition, an accessory (not shown) may be slid onto the rails 914, 916 and over a safety pin 918 or 920 as described in connection with FIGS. 6A, 6B, and 6C.

Figure 10:
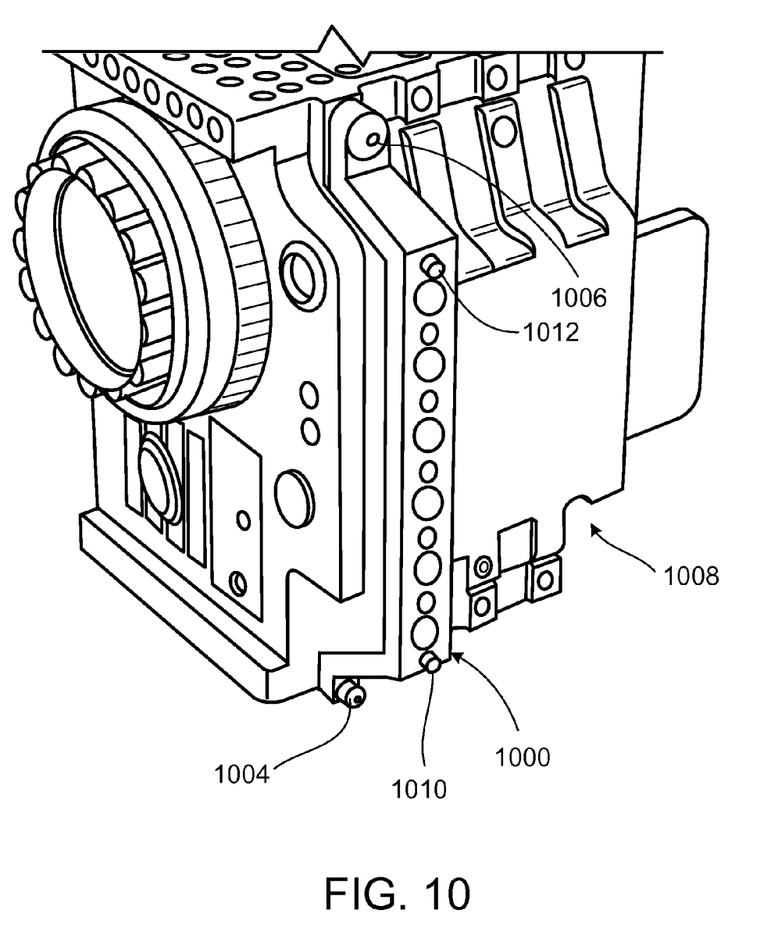
FIG. 10 shows an angled mounting device like that shown in FIGS. 9A and 9B attached to a camera.

FIG. 10 shows an angled mounting device 1000 like that shown in FIGS. 9A and 9B attached to a camera 1002. As can be seen, the mounting device 1000 is attached to the camera 1002 with two screws 1004, 1006. The mounting device 1000 extends outward to clear a protrusion 1008 on the camera 1002. The mounting device has two safety pins 1010, 1012, one on either end.

A number of embodiments have been described. Nevertheless, it will be understood that various modifications may be made without departing from the spirit and scope of the claims. For example, the mounting device may be any desired length and may have a slot area along its center to lighten weight (as shown in FIGS. 1, 2, and 3), or it may be solid without a slot. The rails may be configured differently from what is shown to handle different types of accessories. In addition, the mounting device may have an actuated safety mechanism on one end and a fixed mechanism or structure on the other.

What is claimed is:

1. A mounting apparatus, comprising:
   a body having a first side configured for securing the body to a device and a second side disposed opposite the first side and configured to support an accessory, the body defining first and second support regions respectively disposed at first and second ends of the body, and the body defining a cavity extending substantially along a length of the body between the first and second support regions;
   first and second rails disposed along at least a portion of the body, and each of the first and second rails continuously extending from the first support region to the second support region such that the first and second support regions of the body are disposed between the first and second rails, the first and second rails protruding from the body in substantially opposing directions and being configured to engage the accessory; and
   first and second safety mechanisms respectively disposed within the first and second support regions of the body such that the cavity of the body extends substantially between the first and second safety mechanisms and such that the first and second safety mechanisms are substantially aligned with the cavity, the first and second safety mechanisms configured to removably secure the accessory onto the mounting apparatus,
   wherein each of the first and second rails is formed as a wedge defining a first surface extending at an angle from the second side of the body and defining a second surface extending at an angle with respect to the first surface, the second surface of the rail being spaced apart from the first side of the body,
   wherein a maximum length of the body is at least four times greater than a width of the second side of the body,
   wherein the first safety mechanism is biased to a first configuration in which at least a portion of the first safety mechanism is extended from the second side of the body to secure the accessory in a first position between the first and second safety mechanisms and to prevent the accessory from sliding past the first safety mechanism along the second side of the body,
   wherein the first safety mechanism is depressible from the first configuration to a second configuration in which the at least portion of the first safety mechanism is depressed within the body to permit the accessory to slide from the first position between the first and second safety mechanisms to a second position past the first safety mechanism along the second side of the body, and
   wherein, upon sliding of the accessory past the first safety mechanism, the first safety mechanism is releasable from the second configuration back to the first configuration.

2. The mounting apparatus of claim 1 wherein the first safety mechanism includes a first depressible member that extends from the body at least substantially orthogonal to the first rail and the second rail.

3. The mounting apparatus of claim 2:
   wherein the body is formed as an elongated member extending from the first end to the second end and from a first edge to a second edge, and the first safety mechanism is located at or near the first end of the elongated member;
   wherein the first rail runs along the first edge of the elongated member at least substantially between the first end and the second end;
   wherein the second rail runs along the second edge of the elongated member at least substantially between the first end and the second end; and
   wherein the second safety mechanism is located at or near the second end of the elongated member, the second safety mechanism being a second depressible member that extends from the elongated member at least substantially orthogonal to the first rail and the second rail.

4. The mounting apparatus of claim 3 wherein at least one of the first safety mechanism and the second safety mechanism comprises a channel including a pin actuated by a spring.

5. The mounting apparatus of claim 4 wherein at least one of the first safety mechanism and the second safety mechanism comprises a set screw at a bottom of the channel and wherein the spring is positioned on top of the set screw and the pin is positioned on top of the spring.

6. The mounting apparatus of claim 3 wherein the cavity is configured to lighten the weight of the elongated member.

7. A mounting apparatus, comprising:
   a body having a first side configured for securing the body to a device and a second side disposed opposite the first side and configured to support an accessory, the body defining first and second support regions respectively disposed at first and second ends of the body, and the body defining a cavity extending substantially along a length of the body between the first and second support regions;
   first and second rail means for engaging the accessory, the first and second rail means disposed along at least a portion of the body, and each of the first and second rail means continuously extending from the first support region to the second support region such that the first and second support regions of the body are disposed between the first and second rails means, the first and second rail means protruding from the body in substantially opposing directions; and
   first and second safety means for removably securing the accessory onto the mounting apparatus, the first and second safety means respectively disposed within the first and second support regions of the body such that the cavity of the body extends substantially between the first and second safety means and such that the first and second safety means are substantially aligned with the cavity,
   wherein each of the first and second rail means is formed as a wedge defining a first surface extending at an angle from the second side of the body and defining a second surface extending at an angle with respect to the first surface, the second surface of the rail means being spaced apart from the first side of the body, wherein a maximum length of the body is at least four times greater than a width of the second side of the body, wherein the first safety means is biased to a first configuration in which at least a portion of the first safety means is extended from the second side of the body to secure the accessory in a first position between the first and second safety means and to prevent the accessory from sliding past the first safety means along the second side of the body, wherein the first safety means is depressible from the first configuration to a second configuration in which the at least portion of the first safety means is depressed within the body to permit the accessory to slide past the first safety means along the second side of the body, and wherein, upon sliding of the accessory past the first safety means, the first safety means is releasable from the second configuration back to the first configuration.

8. The mounting apparatus of claim 7 wherein the first safety means includes a first depressible means extending from the body at least substantially orthogonal to the first and second rail means for removably and safely mounting the accessory onto the mounting apparatus.

9. The mounting apparatus of claim 8:
wherein the body is formed as an elongated member extending from the first end to the second end and from a first edge to a second edge;
wherein the first and second rail means respectively run along the first edge and the second edge of the elongated member at least substantially between the first end and the second end; and
wherein the first safety means includes a first depressible means located at or near the first end of the elongated member and the second safety means includes a second depressible means located at or near the second end of the elongated member, the second depressible means extending from the body at least substantially orthogonal to the first and second rail means, the first and the second depressible means for removably and safely mounting the accessory onto the mounting apparatus.

10. The mounting apparatus of claim 9 wherein each of the first depressible means and the second depressible means comprises a channel including a pin actuated by a spring.

11. The mounting apparatus of claim 3 wherein the first rail is a continuous rail without notches and the second rail is a continuous rail without notches; and wherein each of the first safety mechanism and the second safety mechanism comprises a channel including a pin actuated by a spring.

12. The mounting apparatus of claim 6 wherein the first rail is a continuous rail without notches and the second rail is a continuous rail without notches; and wherein each of the first safety mechanism and the second safety mechanism comprises a channel including a pin actuated by a spring.

13. The mounting apparatus of claim 9 wherein the first rail means includes a first rail running along the first edge of the elongated member at least substantially between the first end and the second end and the second rail means includes a second rail running along the second edge of the elongated member at least substantially between the first end and the second end; wherein the first rail is a continuous rail without notches and the second rail is a continuous rail without notches; and wherein each of the first safety means and the second safety means comprises a channel including a pin actuated by a spring.

14. The mounting apparatus of claim 1:
wherein the second safety mechanism is biased to a first configuration in which at least a portion of the second safety mechanism is extended from the second side of the body to secure the accessory in the first position between the first and second safety mechanisms and to prevent the accessory from sliding past the second safety mechanism along the second side of the body,
wherein the second safety mechanism is depressible from the first configuration to a second configuration in which the at least portion of the second safety mechanism is depressed within the body to permit the accessory to slide from the first position between the first and second safety mechanisms to a second position past the second safety mechanism along the second side of the body, and
wherein, upon sliding of the accessory past the second safety mechanism, the second safety mechanism is releasable from the second configuration back to the first configuration.

15. The mounting apparatus of claim 7:
wherein the second safety means is biased to a first configuration in which at least a portion of the second safety means is extended from the second side of the body to secure the accessory in the first position between the first and second safety means and to prevent the accessory from sliding past the second safety means along the second side of the body,
wherein the second safety means is depressible from the first configuration to a second configuration in which the at least portion of the second safety means is depressed within the body to permit the accessory to slide from the first position between the first and second safety means to a second position past the second safety means along the second side of the body, and
wherein, upon sliding of the accessory past the second safety means, the second safety means is releasable from the second configuration back to the first configuration.

16. The mounting apparatus of claim 1:
wherein the device comprises a camera,
wherein the cavity of the body is disposed along a central axis of the body, and
wherein the cavity, the first safety mechanism, and the second safety mechanism are centrally aligned with one another along the body.

17. The mounting apparatus of claim 7:
wherein the device comprises a camera,
wherein the cavity of the body is disposed along a central axis of the body, and
wherein the cavity, the first safety means, and the second safety means are centrally aligned with one another along the body.

* * * * *